(12) United States Patent
James

(10) Patent No.: US 11,618,561 B2
(45) Date of Patent: Apr. 4, 2023

(54) REMOTELY CONTROLLED MULTIROTOR AIRCRAFT COMPRISING AN IMPROVED FRAME

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 333 days.

(21) Appl. No.: 16/638,982

(22) PCT Filed: Aug. 15, 2017

(86) PCT No.: PCT/IB2017/054956
§ 371 (c)(1),
(2) Date: Feb. 13, 2020

(87) PCT Pub. No.: WO2019/034906
PCT Pub. Date: Feb. 21, 2019

(65) Prior Publication Data
US 2020/0361604 A1    Nov. 19, 2020

(51) Int. Cl.
*B64C 9/02* (2006.01)
*B64C 39/02* (2023.01)
*B64D 47/08* (2006.01)

(52) U.S. Cl.
CPC ............ *B64C 39/024* (2013.01); *B64D 47/08* (2013.01); *B64C 2201/027* (2013.01); *B64C 2201/042* (2013.01); *B64C 2201/046* (2013.01); *B64C 2201/06* (2013.01); *B64C 2201/101* (2013.01); *B64C 2201/108* (2013.01); *B64C 2201/127* (2013.01); *B64C 2201/146* (2013.01)

(58) Field of Classification Search
CPC .................................................. B64C 39/024
See application file for complete search history.

(56) References Cited

U.S. PATENT DOCUMENTS

2011/0204188 A1*  8/2011  Marcus ................... B64C 19/00
                                                           244/23 B
2014/0297067 A1   10/2014  Malay
(Continued)

FOREIGN PATENT DOCUMENTS

WO         2017/075695 A1     5/2017

OTHER PUBLICATIONS

International Search Report dated May 7, 2018, issued in PCT Application No. PCT/IB2017/054956, filed Aug. 16, 2017.
(Continued)

*Primary Examiner* — Richard G Davis
(74) *Attorney, Agent, or Firm* — Workman Nydegger

(57) ABSTRACT

A remotely controlled multirotor aircraft having a frame that includes a first and a second peripheral portions, to which at least one first and one second motor can be respectively coupled, and a central portion including a first end and a second end, to which the first peripheral portion and the second peripheral portion are respectively coupled, so that the first peripheral portion develops in a plane that is different from that in which the second peripheral portion develops; furthermore, the central portion also includes a coupling mechanism allowing the coupling between the central portion and a mobile device having video acquisition ability.

20 Claims, 5 Drawing Sheets

(56) References Cited

U.S. PATENT DOCUMENTS

| | | | | |
|---|---|---|---|---|
| 2016/0173742 A1* | 6/2016 | Hassan Zureikat | .... | H04N 7/185 |
| | | | | 348/144 |
| 2016/0376004 A1* | 12/2016 | Claridge | ............... | B64C 39/024 |
| | | | | 701/3 |
| 2017/0036771 A1* | 2/2017 | Woodman | ............... | B64C 25/54 |
| 2017/0201614 A1* | 7/2017 | Deng | ................ | G06F 16/24565 |
| 2018/0327070 A1* | 11/2018 | Rahnama | .............. | G05D 1/0094 |
| 2019/0028133 A1* | 1/2019 | Stroppiana | .............. | H04M 1/21 |
| 2019/0118972 A1* | 4/2019 | Yan | ...................... | F16M 11/123 |

OTHER PUBLICATIONS

Written Opinion dated May 7, 2018, issued in PCT Application No. PCT/IB2017/054956, filed Aug. 16, 2017.

\* cited by examiner

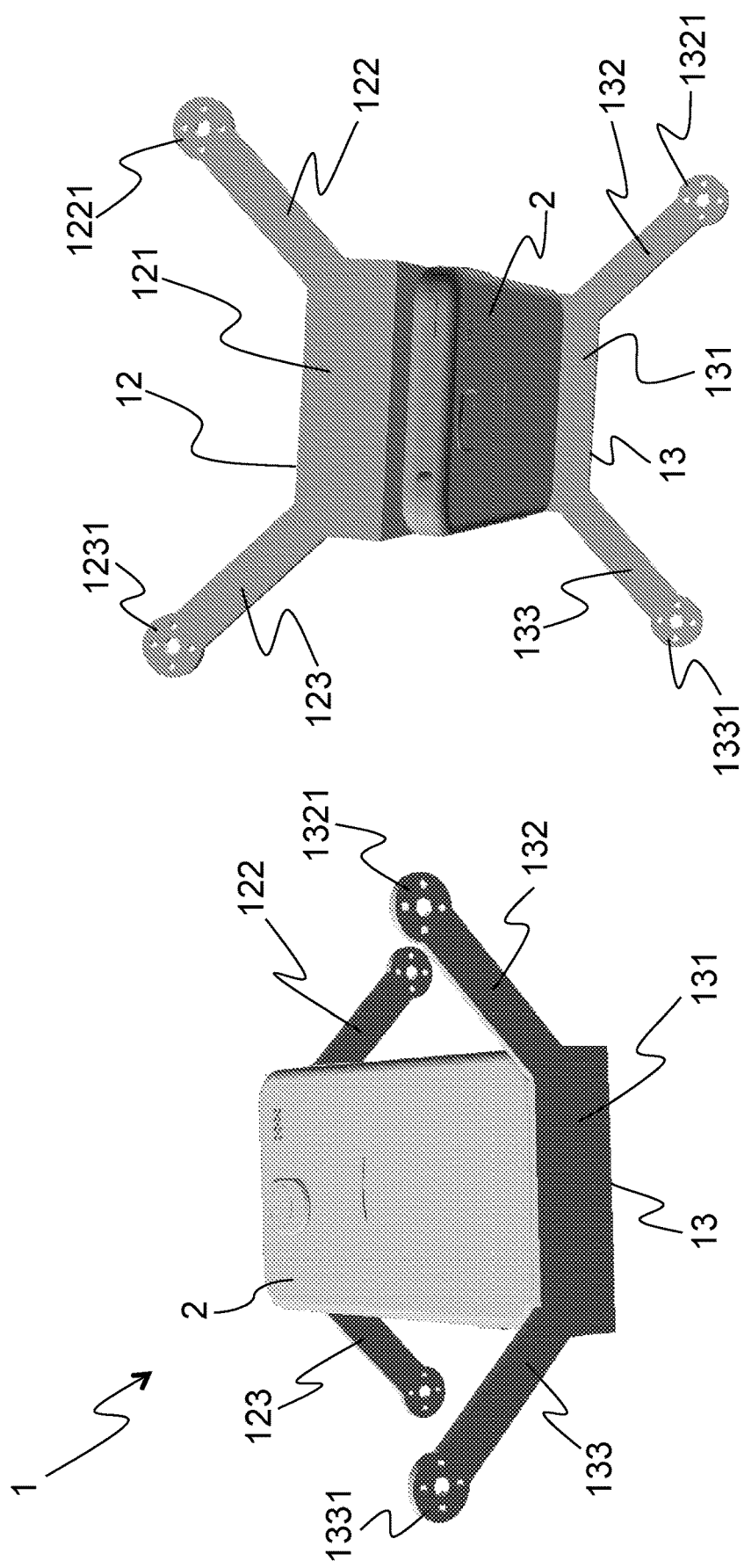

REMOTELY CONTROLLED MULTIROTOR AIRCRAFT COMPRISING AN IMPROVED FRAME

BACKGROUND OF THE INVENTION

1. The Field of the Invention

The present invention relates to a remotely controlled multirotor aircraft comprising an improved frame; in particular, an aircraft capable of lifting and carrying in flight a mobile device (e.g., a smartphone or a tablet) comprising video acquisition means (e.g., a fixed or moving image sensor), so that such video acquisition means can acquire images (e.g., photographic portraits, also known as 'selfies') from positions hardly reachable by a support according to the state of the art (e.g., a 'selfie stick' or the like).

2. The Relevant Technology

As is known, a multirotor aircraft (e.g., a bicopter, a tricopter, a quadcopter, a hexacopter, or the like) is intrinsically unstable, and therefore requires constant adjustment of the speed of the motors to maintain the orientation set by the (human or automatic) pilot. Speed control is normally effected by suitable controllers (e.g., proportional, integral and derivative controllers—also known as PIDs, which act in a distinct manner upon each one of the three axes of rotation of the aircraft (also known as axes of roll, pitch and yaw), so as to keep the angular revolution speeds along such axes as close as possible to the values desired by the pilot.

This continuous adjustment of the motors' revolution speeds inevitably results in oscillations of the aircraft and/or vibrations propagating along the frame thereof; such oscillations and/or vibrations make image acquisition difficult, because in certain exposure conditions the photos and/or videos acquired by the video acquisition means may be affected by microblur and/or by the rolling shutter effect (also known as 'Jello').

Several techniques are currently known in the art for reducing the microblur and/or the rolling shutter effect in multirotor aircraft; in particular, such effects can be partially attenuated by mounting the video acquisition means on a support capable of absorbing vibrations (e.g., a support lying on a layer of silicone-based gel). This solution allows absorbing the vibrations of the frame, which are mainly due to stresses (of the order of kHz) produced by the motors, but cannot compensate for the oscillations of the aircraft, the frequency of which is typically lower (i.e., less than 100 Hz), that are due to external noise (e.g., wind). One solution for reducing the oscillations of the aircraft consists of using a servo-assisted cardan support (also known as 'gimbal'), which can correct the orientation of the acquisition means when the aircraft is oscillating, e.g., because of the wind. This solution is not suitable, however, for use on small aircraft, because these servo-assisted cardan supports comprise at least three servomotors (one per axis) and are therefore excessively heavy for use on small aircraft. Moreover, for use by the general public, these types of aircraft must also meet regulations that, in some countries, limit the allowable take-off weight, e.g., to less than 200-250 grams. Therefore, the use of a servo-assisted cardan support is often impossible, if one wants to comply with the weight limits set out in the regulations.

SUMMARY OF THE INVENTION

The present invention aims at solving these and others problems by providing a frame for a remotely controlled multirotor aircraft as set forth in the appended claim 1.

The basic idea of the present invention is to create and use a frame for a multirotor aircraft that comprises a central portion to which a mobile device can be coupled, and a first an a second peripheral portions respectively coupled to two distinct ends of said central portion, wherein at least one motor can be coupled to each one of said peripheral portions, and wherein said peripheral portions are not coplanar, i.e., develop in distinct planes.

Thus, the video acquisition means of the mobile device are positioned closer to the center of mass of the aircraft, compared to a multirotor aircraft according to the prior art, wherein the video acquisition device (e.g., a video camera C shown in FIG. 1) must necessarily be positioned at a point along an edge of the frame, i.e., far from the center of mass (designated as CM in FIG. 1) of the aircraft. In fact, in the case of the multirotor aircraft of FIG. 1, the video camera C will be particularly sensitive to pitch movements, because its position away from the center of mass will cause the free oscillations of the aircraft along the axis of pitch to have sufficient amplitude to create problems when shooting photos and/or videos in particular atmospheric and exposure conditions, e.g., when it is windy and there is a low light level, i.e., when the aircraft tends to oscillate to compensate for the action of the wind, and exposure time needs to be increased in order to attain proper exposure in low-light conditions.

Furthermore, in a multirotor aircraft according to the prior art (like the one shown in FIG. 1), the purpose of which is to acquire videos and/or images, such as photographic portraits, positioning the video acquisition means far from the center of mass is also necessary to ensure that the visual field will not be obstructed by rotors and/or parts of the frame (such as arms or other parts).

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein:

FIGS. 3-6 are perspective views of the frame of FIG. 2, observed from different viewpoints.

DETAILED DESCRIPTION OF THE PREFERRED EMBODIMENTS

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate. The references below are therefore used only for simplicity's sake and do not limit the protection scope or extent of the various embodiments.

Figure 1:
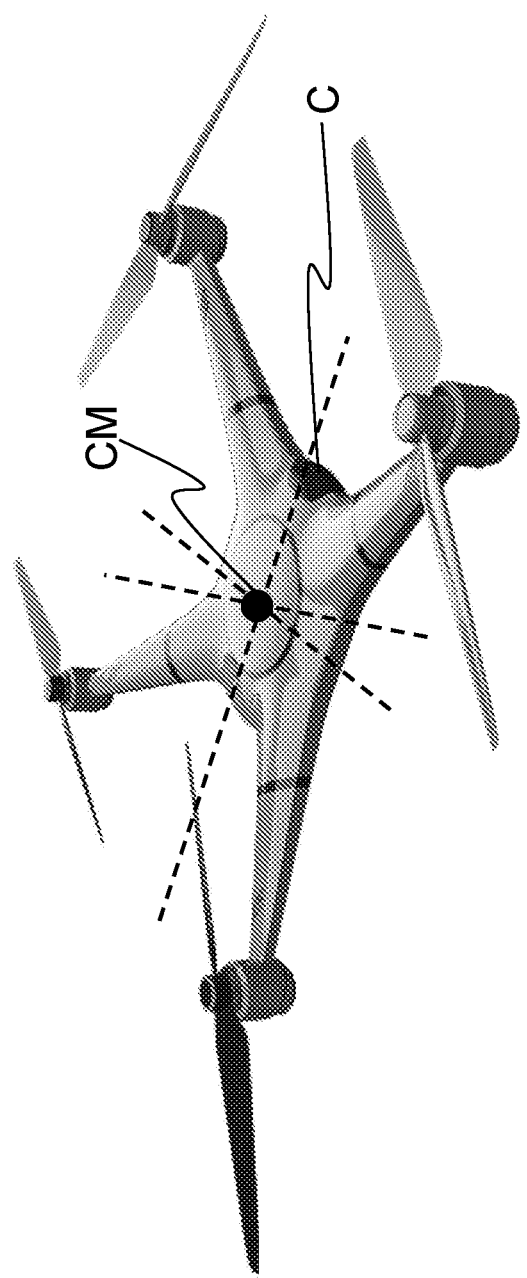
FIG. 1 is a perspective view of a multirotor aircraft according to the prior art.
Figure 2:
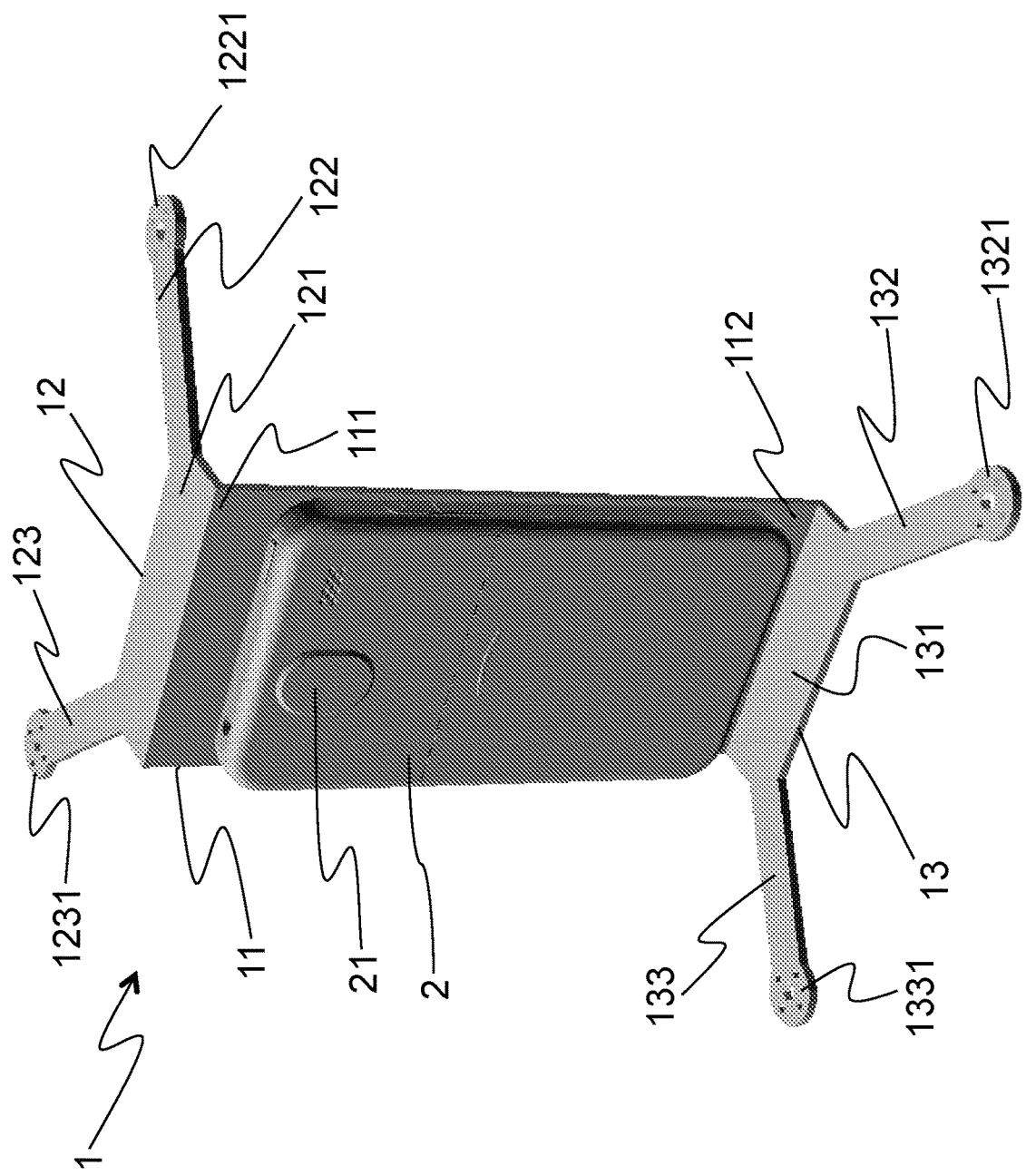
FIG. 2 is a perspective view of one possible embodiment of a frame for a multirotor aircraft according to the invention, to which a mobile device is coupled.
Figure 3:
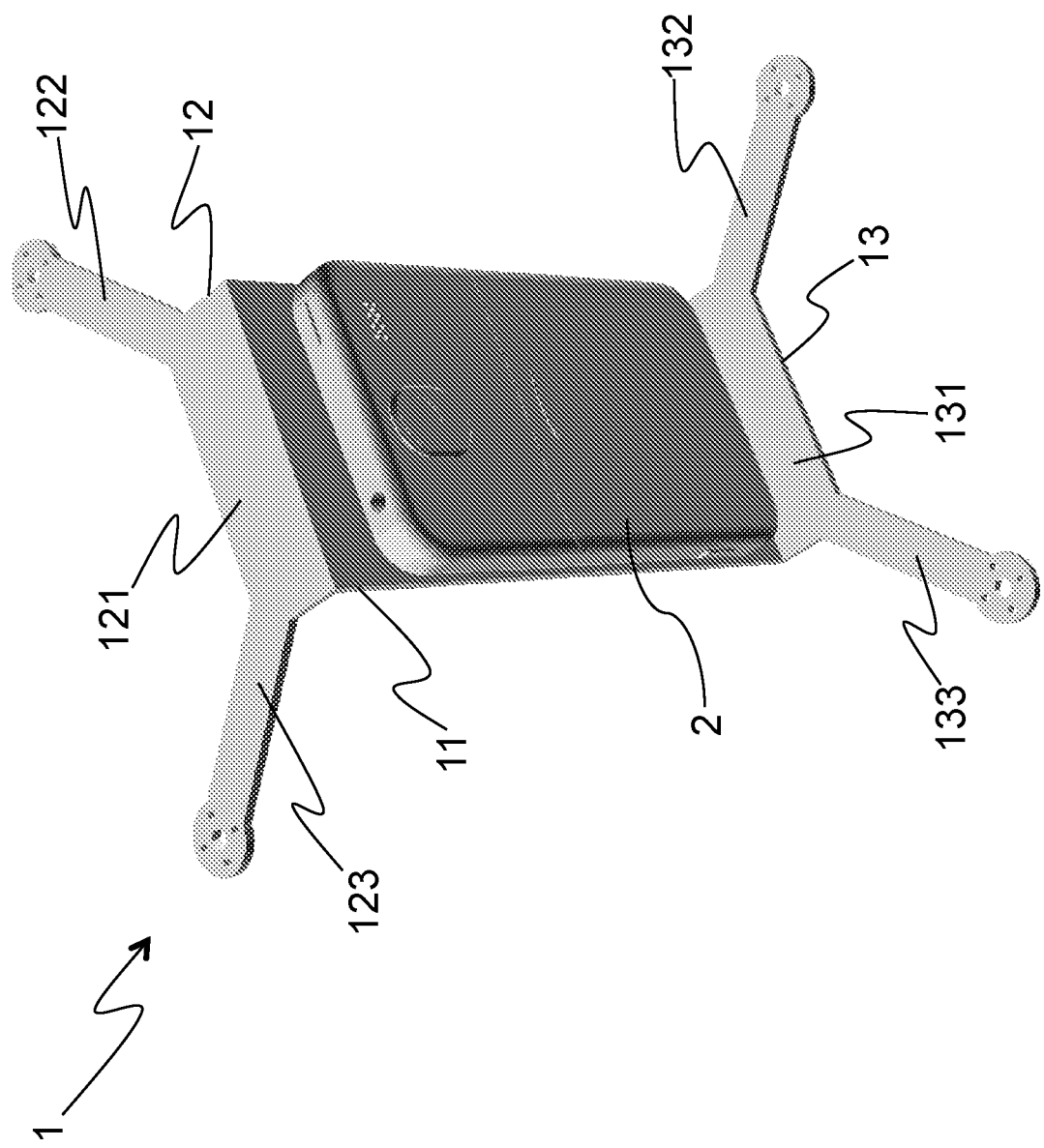
Figure 4:
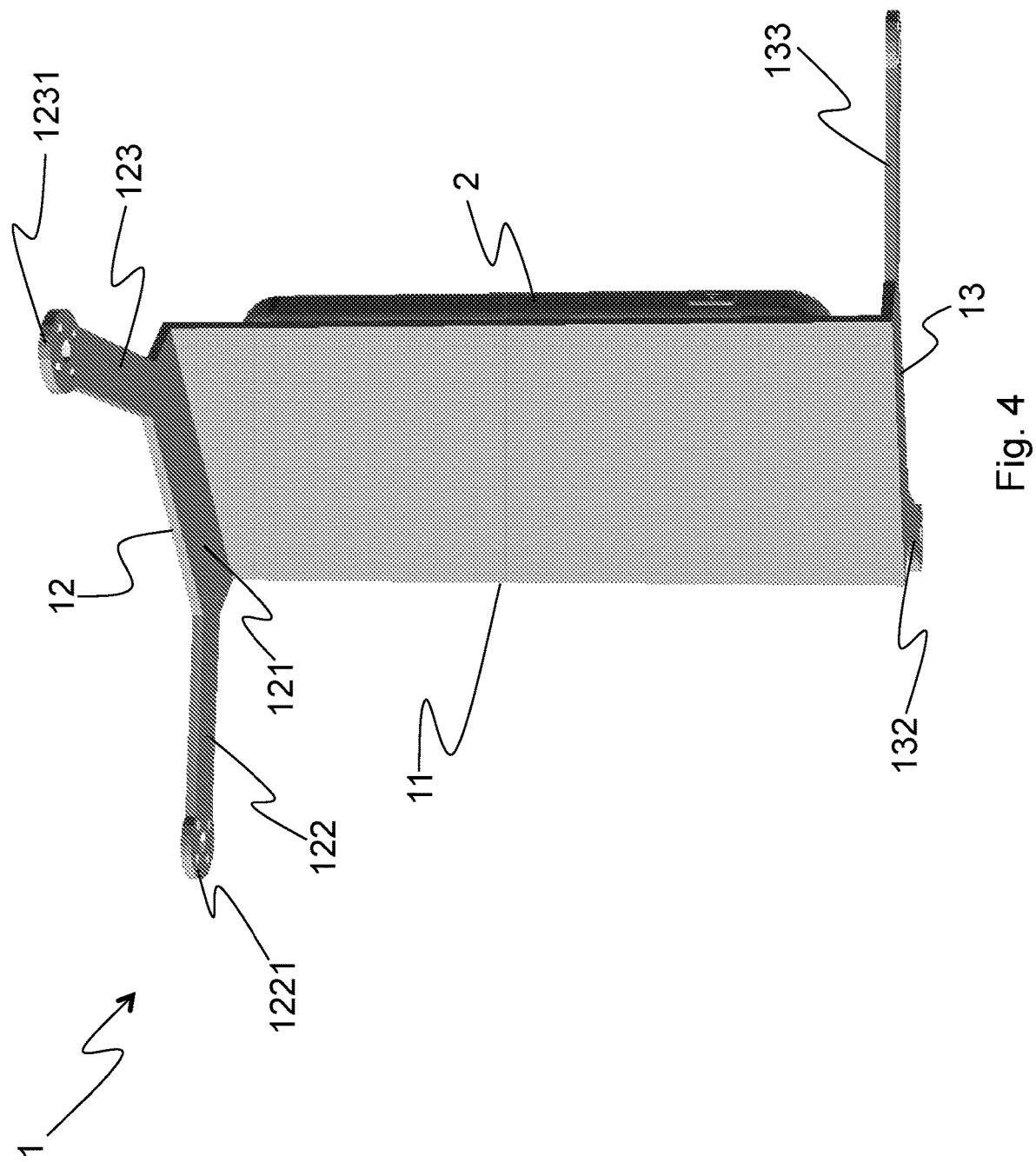

With reference to FIGS. 2-6, a remotely controlled multirotor aircraft comprises a frame 1 according to the invention; said frame 1 comprises the following parts:

- a central portion 11 comprising coupling means (not shown in the annexed drawings), adapted to allow the coupling between a mobile device 2 and said frame 1;
- a (first) upper peripheral portion 12, to which at least one motor can be coupled, preferably two motors having similar characteristics and configured for turning in opposite directions of rotation;
- a (second) lower peripheral portion 13, to which at least one motor can be coupled, preferably two motors similar to those that can be coupled to the upper peripheral portion, and configured for turning in opposite directions of rotation.

The upper peripheral portion 12 is coupled to a first end 111 of the central portion 11, while the lower peripheral portion 13 is coupled to a second end 112 (preferably opposite to the first end 111) of the central portion 11; therefore, each one of the peripheral portions 12,13 is coupled to one of the ends 111,112 of said central portion 11, wherein said ends 111,112 are distinct from each other. Furthermore, said peripheral portions 12,13 are not coplanar, i.e., the upper peripheral portion 12 develops in a plane that is different from that in which the lower peripheral portion 13 develops; more in detail, such planes are preferably parallel to each other, but are located at different heights relative to a reference plane.

This particular arrangement of the portions 11,12,13 of the frame 1 allows the central portion 11 to receive a mobile device (e.g., a smartphone, a tablet, or the like, the shape of which, as is known, is very similar to a parallelepipedon) comprising video acquisition means 21 (e.g., a video camera) in a suitable position (i.e., substantially vertical or anyway with a downward or upward angle of 10 to 30 sexagesimal degrees) for exploiting said video acquisition means 21 in order to acquire images in flight; in fact, said video acquisition means 21 comprise a lens that, as is known, looks through a hole formed in the front or back face of said terminal, i.e., one of the two largest faces of the terminal 2.

It must also be pointed out that this particular shape allows keeping the center of mass of the aircraft (which comprises said frame 1) near the central portion 11 of the frame, and hence also near to the video acquisition means 21 of the device 2, thereby reducing the amplitude of the vibrations/oscillations to which said video acquisition means 21 are subjected in flight.

The coupling means comprised in the central portion 11 may comprise a case compatible with the shape of the mobile device 2 and/or one or more magnets suitable for keeping the mobile device 2 coupled to said central portion 11 and/or a layer of bi-adhesive gel (preferably silicone-based gel) attached on one side to the portion 111 and on the other side to one of the surfaces of the mobile device, and/or the like. It must be pointed out that the solution using a layer of gel is also useful to reduce the amount of vibrations that reach the mobile device 2, and hence the video acquisition means 21, when the aircraft comprising the frame 1 described herein is in operation.

The portions 11-13 of the frame 1 are preferably made of composite material (e.g., carbon fiber or fiberglass) or metallic or plastic material.

The central portion 11 may preferably have a parallelepiped shape, the largest faces of which are sufficiently big to allow the coupling of said mobile device 2, whereas the thickness of said central portion 11 may preferably be comprised between 1 mm and 3 mm.

As already described, the upper peripheral portion 12 preferably has a planar development; also, said upper peripheral portion 12 may preferably comprise the following parts:

- an upper main part 121 having a parallelepiped or trapezoidal shape or a shape with curved contours, firmly constrained to the central portion 11 and preferably perpendicular to the latter;
- a pair of upper arms 122,123 extending from the upper main part 121, preferably in a symmetrical fashion, wherein each one of said upper arms comprises an upper housing 1221,1231 for at least one motor (not shown in the annexed drawings), preferably of the 11XX or 13XX type, or the like.

Moreover, also the upper peripheral portion 12, just like the central portion 11, preferably has a thickness in the range of 1 mm to 3 mm.

The shape of the lower peripheral portion 13 is preferably similar to that of the upper peripheral portion 12; in fact, also the lower peripheral portion 13 may preferably comprise the following parts:

- a lower main part 131 having a parallelepiped or trapezoidal shape or a shape with curved contours, firmly constrained to the central portion 11 and preferably perpendicular to the latter;
- a pair of lower arms 132,133 extending from the lower main part 131, preferably in a symmetrical fashion, wherein each one of said arms comprises a lower housing 1321,1331 for at least one motor of a type similar to those used in the upper peripheral portion 12.

Moreover, also the lower peripheral portion 13 preferably has a thickness in the range of 1 mm to 3 mm.

As aforementioned, the portions 11-13 of the frame 1 may preferably be made of carbon fiber material or metallic material.

When the frame 1 is made of carbon fiber, each one of the portions 11-13 can be formed by cutting to shape (e.g., by means of a numerical control mill) a carbon fiber panel having suitable thickness, preferably in the range of 1 mm to 3 mm; such portions can then be coupled to each other through the use of fastening means, e.g., aluminium joints (e.g., L-shaped joints), which, through screws and threaded seats or nuts, will keep the different portions 11-13 of the frame 1 coupled together.

As an alternative, the frame 1 can also be manufactured from a plurality of carbon fiber sheets, appropriately oriented and positioned in a mould together with a resin, preferably an epoxy resin that cures after having been heated for an adequate time at an adequate temperature. In other words, the portions 11-13 are thus made as one piece, thereby reducing the weight of the frame 1. Advantageously, less power will thus be required from the motors for the aircraft comprising said frame 1 to remain in flight, thus reducing the revolution speed of said motors. This will also reduce the vibrations generated by the motors, thus reducing the amplitude of the vibrations/oscillations that affect said video acquisition means 21 of the mobile device 1 in flight, in particular during the acquisition of images (whether photographs or videos).

When the frame 1 is made of metallic material, the portions 11-13 can be, in this case as well, manufactured separately (e.g., by cutting a metal panel of suitable thickness), or can be made as one piece (e.g., by pressing). In this latter case, the advantages will be the same as those described for carbon fiber, i.e., reduced aircraft weight, resulting in reduced amplitude of the vibrations/oscillations to which said video acquisition means 21 are subjected in flight.

The man skilled in the art will be able to manufacture the frame 1 differently than described herein (e.g., by creating hollow frame portions of plastic material, such as polymethylmethacrylate), without however departing from the teachings of the present invention.

In combination with the above, the aircraft may comprise electronic equipment (so-called avionics), which may in turn comprise speed controllers for controlling the speed of the motors, a flight controller for controlling the trim of the aircraft, a battery for supplying power to the motors and/or to said electronic equipment, etc.; such electronic equipment is coupled, via constraining means (such as, for example, screws and/or bolts, bi-adhesive tape, or the like), to one of the peripheral portions 12,13 (of the frame 1) which is closer to the position where the video acquisition means 21 can be located. In the annexed drawings, this portion is the upper peripheral portion 12, because the phone has the video acquisition means 21 positioned in its upper part. It is nevertheless possible to couple said equipment to the lower peripheral portion 13, if the video acquisition means 21 of the mobile device 2 are located near the bottom, e.g., because the mobile device coupled to the frame 1 has a different arrangement of the video acquisition means than shown in the annexed drawings, or because in a particular situation (e.g., when producing creative videos) it is convenient to mount said mobile device upside-down.

The coupling of the electronic equipment to that peripheral portion 12,13 (of the frame 1) which is less distant from the position where the video acquisition means 21 are located moves the center of mass of the aircraft closer to the video acquisition means 21. This advantageously reduces the oscillations/vibrations to which said video acquisition means 21 are subjected while said aircraft is flying.

In a particularly advantageous variant, the above-described electronic equipment can be obtained, whether partly or totally, by exploiting the hardware already included in the mobile device 2. For example, the battery may be the one of the mobile device 2, and/or the computing power required by the avionics may be provided by the microprocessors included in the mobile device 2. In this case, the electric connections between the motors of the aircraft and the on-board electronics of the mobile device 2 can be established by means of a suitable plug-in connector to be connected to the output connector of the mobile device 2 and to a wiring harness housed in the frame 1. This advantageously prevents the aircraft from growing in weight because of the use of a dedicated battery and/or avionics external to the mobile device 2. Also the gyroscopes and accelerometers necessary for controlling the flight of the aircraft may be those already included in the mobile device 2, thus advantageously reducing the weight of the aircraft. In other words, the mobile device 2 comprises a battery for supplying power to said aircraft and/or said mobile device 2 is configured for controlling the flight of said aircraft, e.g., by generating appropriate control signals (sent to the motors or to the motors' speed controllers) according to the outputs of the accelerometers and/or gyroscopes included in said mobile device 2. This ensures a weight reduction that results in less vibration generated by the motors, thus reducing the amplitude of the vibrations/oscillations that affect said video acquisition means 21 of said mobile device 2 during the flight.

As an alternative to or in combination with the above, the aircraft may comprise an air balloon, i.e., a container that, when filled with gas (e.g., helium or hot air), generates an upward thrust force (also known as Archimedes' thrust). In this manner, the revolution speed of the motors can advantageously be reduced (especially in leveled flight), thus also reducing the vibrations generated by said motors and the amplitude of the vibrations/oscillations to which said video acquisition means 21 of the mobile device 2 are subjected in flight.

Furthermore, the air balloon is preferably so configured that the modulus of the upward force it generates preferably has a value smaller than or equal to the value of the modulus of the weight force generated by the mass of the aircraft, so as to prevent uncontrolled rising of the aircraft in the event of a motor failure.

More in detail, the upper peripheral portion 12 (or the lower peripheral portion 13) may comprise hooking means (not shown in the drawings), such as, for example, a hook or a pair of slots on its surface, to which the air balloon can be hooked, preferably by means of a string or the like.

As an alternative to or in combination with the above, the aircraft may comprise a rocket, preferably a rocket propelled by a chemical engine, coupled to the frame 1, preferably to the surface of the central portion 11 opposite to the surface whereon the mobile device 2 can be positioned; said rocket is so positioned that, when it is in an operating condition, it will generate an upward force, i.e., an ascensional force. In this way it is advantageously possible to reduce the revolution speed of the motors and hence the vibrations generated by said motors, thereby reducing the amplitude of the vibrations/oscillations that affect said video acquisition means 21 of the mobile device 2 during the flight.

As in the case of the air balloon, the modulus of the force generated by the rocket preferably has a value smaller than or equal to the modulus of the weight force to which the aircraft is subjected, so as to prevent uncontrolled rising of the aircraft in the event of a motor failure.

More in detail, the central portion 11, preferably the surface of the central portion 11 opposite to the surface whereon the mobile device 2 can be positioned, may comprise a housing into which said rocket can be arranged; said housing is preferably a cavity into which a part, preferably the upper part, of the rocket can be inserted, so that the combustion chamber and the nozzle of said rocket will advantageously remain outside said cavity, thus preventing heating (when the rocket is in operation) of the frame 1 and of all elements coupled thereto, such as the mobile device 2, the electronic equipment, etc. Moreover, the surface to which the rocket is coupled may be coated with heat-resistant material (also known as thermal insulator) to prevent the frame 1 and, most importantly, the mobile device 2 from being excessively heated by the rocket in operation.

Of course, the example described so far may be subject to many variations.

Although this description has tackled some of the possible variants of the invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. A remotely controlled multirotor aircraft having a frame that comprises:

a first peripheral portion, to which at least one first motor can be coupled, a second peripheral portion, to which at least one second motor can be coupled, a central portion comprising:
coupling means allowing the coupling between said central portion and a mobile device comprising video acquisition means,
a first end and a second end, to which the first peripheral portion and the second peripheral portion are respectively coupled, wherein the first peripheral portion develops in a plane that is different from a plane in which the second peripheral portion develops wherein said central portion, said first peripheral portion, and said second peripheral portion are each in a form of a planar panel, wherein said first peripheral portion and said second peripheral portion are angled with respect to said central portion, and wherein said first peripheral portion and said second peripheral portion are disposed parallel to each other and outwardly project in two opposed directions.

2. The remotely controlled multirotor aircraft according to claim 1, wherein the portions are made as one piece.

3. The remotely controlled multirotor aircraft according to claim 1, wherein the coupling means comprise a case compatible with the shape of the mobile device.

4. The remotely controlled multirotor aircraft according to claim 1, wherein the coupling means comprise at least one magnet for keeping the mobile device coupled to said central portion.

5. The remotely controlled multirotor aircraft according to claim 1, wherein the coupling means comprise a layer of bi-adhesive gel.

6. The remotely controlled multirotor aircraft according to claim 1, wherein the shape of the frame is such that, when the mobile device is coupled to said frame via the coupling means, the center of mass of the aircraft is located near the central portion of said frame.

7. The remotely controlled multirotor aircraft according to claim 1, comprising constraining means and electronic equipment that are coupled, via said constraining means, to one of the peripheral portions of said frame.

8. The remotely controlled multirotor aircraft according to claim 1, comprising the mobile device coupled, via the coupling means, to the central portion of the frame, wherein said mobile device comprises a battery for supplying power to said aircraft and/or said mobile device is configured for controlling the flight of said aircraft.

9. The remotely controlled multirotor aircraft according to claim 1, comprising an air balloon coupled to the frame.

10. The remotely controlled multirotor aircraft according to claim 9, wherein said aircraft has a mass that generates a weight force, and the air balloon is configured for generating an ascensional force having a modulus that is smaller than or equal to the modulus of said weight force.

11. The remotely controlled multirotor aircraft according to claim 9, wherein the first or the second peripheral portion comprises hooking means for hooking said air balloon.

12. The remotely controlled multirotor aircraft according to claim 1, comprising a rocket coupled to the frame and so positioned as to generate, when it is in an operating condition, an ascensional force.

13. The remotely controlled multirotor aircraft according to claim 12, wherein said aircraft has a mass that generates a weight force, and the ascensional force generated by said rocket has a modulus that is smaller than or equal to the modulus of said weight force.

14. The remotely controlled multirotor aircraft according to claim 12, wherein said central portion comprises a housing into which said rocket can be positioned.

15. A remotely controlled multirotor aircraft having a frame that comprises:
an elongated central portion having a front face and an opposing back face that each laterally extend to opposing side edges and that each longitutionally extend between a first end and an opposing second end;
a first peripheral portion to which at least one first motor can be coupled, the first peripheral portion outwardly projecting from the first end of the central portion so that an inside angle is formed between the front face of the central portion and the first peripheral portion;
a second peripheral portion to which at least one second motor can be coupled, the second peripheral portion outwardly projecting from the second end of the central portion so that an inside angle is formed between the back face of the central portion and the second peripheral portion; and
coupling means for coupling a mobile device comprising a video camera to the central portion.

16. A remotely controlled multirotor aircraft according to claim 15, wherein the first end of the central portion terminates at a first corner that laterally extends between the opposing side edges, the first peripheral portion outwardly projecting from the first corner.

17. A remotely controlled multirotor aircraft according to claim 16, wherein the second end of the central portion terminates at a second corner that laterally extends between the opposing side edges, the second peripheral portion outwardly projecting from the second corner, the first peripheral portion and the second peripheral portion projecting in opposite directions.

18. A remotely controlled multirotor aircraft according to claim 17, further comprising:
a first pair of spaced apart arms outwardly projecting from the first peripheral portion so as to extend away from the central portion; and
a second pair of spaced apart arms outwardly projecting from the second peripheral portion so as to extend away from the central portion.

19. A remotely controlled multirotor aircraft according to claim 17, further comprising:
the central portion comprising a flat panel wherein the front face and the back face thereof are planar;
the first peripheral portion comprising a flat panel having a front face and an opposing back face that are planar; and
the second peripheral portion comprising a flat panel having a front face and an opposing back face that are planar.

20. A remotely controlled multirotor aircraft according to claim 19, wherein a distance between the front face and the back face of each of the central portion, first peripheral portion, and second peripheral portion is between 1 mm and 3 mm.

* * * * *